(12) United States Patent
Nagata

(10) Patent No.: US 7,024,577 B2
(45) Date of Patent: Apr. 4, 2006

(54) PROGRAM LOGIC DEVICE FOR SYNCHRONOUS OPERATION WITH MULTIPLE CLOCK SIGNALS

(75) Inventor: Masahiro Nagata, Hamamatsu (JP)

(73) Assignee: Nihon Computer Co., Ltd., (JP)

( * ) Notice: Subject to any disclaimer, the term of this patent is extended or adjusted under 35 U.S.C. 154(b) by 654 days.

(21) Appl. No.: 09/891,651

(22) Filed: Jun. 25, 2001

(65) Prior Publication Data

US 2001/0054912 A1 Dec. 27, 2001

(30) Foreign Application Priority Data

Jun. 26, 2000 (JP) .............................. 2000-191025
Jul. 4, 2000 (JP) .............................. 2000-202833

(51) Int. Cl.
*G06F 1/04* (2006.01)
*G06F 1/12* (2006.01)

(52) U.S. Cl. ...................................... 713/401; 713/503
(58) Field of Classification Search ................ 713/503, 713/600, 400–501
See application file for complete search history.

(56) References Cited

U.S. PATENT DOCUMENTS

| | | | |
|---|---|---|---|
| 3,996,565 A | 12/1976 | Nakao et al. | |
| 4,172,289 A | 10/1979 | Struger et al. | |
| 4,476,527 A * | 10/1984 | Clayton, IV | 710/29 |
| 4,831,573 A | 5/1989 | Norman | |
| 5,448,715 A * | 9/1995 | Lelm et al. | 713/600 |
| 5,790,842 A * | 8/1998 | Charles et al. | 713/600 |
| 5,796,995 A * | 8/1998 | Nasserbakht et al. | 713/503 |
| 6,584,575 B1 * | 6/2003 | Meyer et al. | 713/400 |
| 6,799,280 B1 * | 9/2004 | Edenfield et al. | 713/400 |

FOREIGN PATENT DOCUMENTS

| | | |
|---|---|---|
| EP | 0310220 A2 | 7/1988 |
| EP | 0 549 334 | 10/1999 |
| JP | 08-076974 | 3/1996 |
| JP | 11-251442 | 9/1999 |

* cited by examiner

*Primary Examiner*—Dennis M. Butler
(74) *Attorney, Agent, or Firm*—Harness, Dickey & Pierce P.L.C.

(57) ABSTRACT

An object of the present invention is to provide a programmable logic device capable of exchanging information with a logic constitution connected to a control processor and operating synchronously with a standard clock.

The present invention comprises a control processor operating according to a high speed clock obtained by multiplying a standard clock, an input unit for inputting signal information into the control processor, and an output unit for outputting the signal information of the control processor as a signal, and characterized in that while the control processor is executing a plurality of processings according to the high speed clock, control is determined according to a value of the signal captured by the input unit synchronously with the standard clock within one cycle and a value of the output unit is changed by the control.

15 Claims, 6 Drawing Sheets

PROGRAM LOGIC DEVICE FOR SYNCHRONOUS OPERATION WITH MULTIPLE CLOCK SIGNALS

BACKGROUND OF THE INVENTION

1. Field of the Invention

The present invention relates to a program logic apparatus capable of inputting and outputting external signals by means of a program.

2. Description of Related Art

Conventionally, a microprocessor serving as a control processor is built in an electronic apparatus of various types and utilized as a built-in control device for controlling the entire apparatus. The microprocessor executes a programmable sequence inside the apparatus.

The microprocessor as stated above has an input/output terminal referred to as a PIO (peripheral input-output). By changing a register and a memory map for controlling the PIO, the microprocessor can input and output digital information from an input/output pin connected to an external device. That is, the microprocessor can capture an external signal state and output a signal and a signal pattern to the external device through the PIO. Further, the PIO can be programmably changed to an input terminal or an output terminal by the control of the microprocessor.

The microprocessor operates based on a clock created for the processor. An event which occurs on the tip of the input/output pin, such as the PIO, to be controlled is, by contrast, not synchronous with the clock of the microprocessor.

However, no mechanism for synchronizing with a standard clock, as a time unit, for determining external logic connected to the input/output pin is prepared for the input/output control of the PIO in the microprocessor. Due to this, control branching for the microprocessor occurs under internal conditions based on the processing result of the microprocessor and cannot be synchronized with the standard clock, with the result that it is difficult to exchange information between the microprocessor and an external logic constitution synchronous with the standard clock through the input/output pin.

Further, while it is possible to reflect the information of the input pin on a program operation by an interrupt, an interrupt jumping function responds asynchronously with the change of an input signal for receiving an interrupt request and then changes a command execution address. Due to this, the interrupt jumping function is asynchronous with the clock and it is difficult to exchange information with the external logical constitution synchronous with the standard clock using interrupt timing.

Moreover, an interrupt is difficult to execute under combined conditions. Even if an interrupt signal can be inputted, it is required to carry out a cause specifying operation after the interrupt occurs, making a program processing complicated to thereby cause delay.

SUMMARY OF THE INVENTION

The present invention has been made under these circumstances. It is, therefore, an object of the present invention to provide a program logic device capable of correctly exchanging information with a logic constitution connected to a control processor and operating synchronously with a standard clock.

A program logic device recited in claim 1 is characterized by comprising: a control processor operating according to a high speed clock, the high speed clock obtained by multiplying a standard clock; input means for inputting signal information into the control processor; and output means for outputting the signal information of the control processor as a signal, and in that while the control processor is executing a plurality of processings according to the high speed clock, control is determined according to the signal captured by the input means synchronously with the standard clock within one cycle and a value of the output means is changed by the control.

A program logic device recited in claim 2 is characterized by comprising: a control processor operating according to a high speed clock, the high speed clock obtained by multiplying a standard clock; input means for inputting signal information into the control processor; and output means for outputting the signal information of the control processor as a signal, and in that while the control processor is executing a plurality of processings according to the high speed clock, control is determined according to a value of the signal captured by the input means synchronously with the standard clock within a plurality of cycles of the standard clock and a value of the output means is changed by the control.

A program logic device recited in claim 3 is characterized in that the value of the output means is changed synchronously with the standard clock.

A program logic device recited in claim 4 is characterized in that the control processor has a delay function to synchronize with the standard clock and conducts a next processing after waiting for a predetermined transition of the standard clock.

A program logic device recited in claim 5 is characterized in that the control conducted by the control processor is determined according to the value of the signal captured by the input means synchronously with the standard clock. It is assumed that the control described in claim 5 differs from the control described in claim 1, i.e., the control for changing the value of the output means.

A program logic device recited in claim 6 is characterized in that the program logic device comprises: comparison value storage means for storing a predetermined comparison value in advance; and a comparator for comparing the comparison value with the value of the signal captured by the input means synchronously with the standard clock, and in that a control content of the control processor is determined according to a comparison result of the comparator.

A program logic device recited in claim 7 is characterized in that the program logic device comprises: comparison value storage means for storing a predetermined comparison value in advance; preprocessing means for performing an arithmetic operation of the value of the signal captured by the input means synchronously with the standard clock, and for setting the value of the signal; and comparison means for comparing the comparison value with the value set by the preprocessing means, and in that a control content of the control processor is determined according to a comparison result of the comparator.

A program logic device recited in claim 8 is characterized in that after waiting for the value of the signal captured by the input means synchronously with the standard clock to become a predetermined value, the control set by the predetermined value is conducted.

A program logic device recited in claim 9 is characterized in that a wait state is released when the number of cycles of the standard clock reaches a predetermined number after the wait state.

A program logic device recited in claim 10 is characterized in that a wait state is released by controlling the control processor for itself.

A program logic device recited in claim 11 is characterized in that a wait state is released when the value of the signal captured by the input means becomes a predetermined value.

A program logic device recited in claim 12 is characterized in that an interrupt synchronous with the standard clock is generated to the control processor according to the value of the signal captured by the input means synchronously with the standard clock.

A program logic device recited in claim 13 is characterized in that the program logic device comprises: comparison value storage means for storing a predetermined comparison value in advance; and a comparator for comparing the comparison value with the value of the signal captured by the input means synchronously with the standard clock, and in that an interrupt synchronous with the standard clock is generated to the control processor according to a comparison result of the comparator.

A program logic device recited in claim 14 is characterized in that the program logic device comprises: comparison value storage means for storing a predetermined comparison value in advance; preprocessing means for performing an arithmetic operation of the value of the signal fetched by the input means synchronously with the standard clock, and for setting the value of the signal; and a comparator for comparing the comparison value with the value of the signal set by the preprocessing means, and in that an interrupt synchronous with the standard clock is generated to the control processor.

A program logic device recited in claim 15 is characterized in that an interrupted position in the control processor is changed according to a comparison result of the comparator.

DESCRIPTION OF THE EMBODIMENTS OF THE INVENTION

Figure 5:
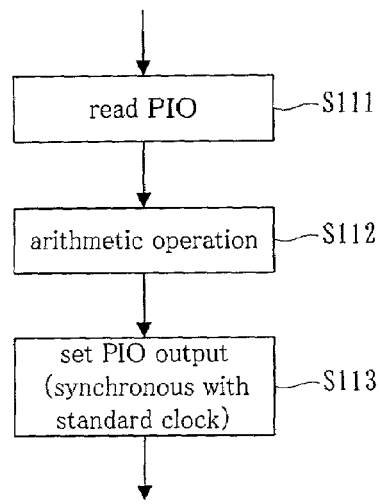
FIG. 5 is a flow chart for showing the important parts of another example of the first embodiment.
Figure 6:
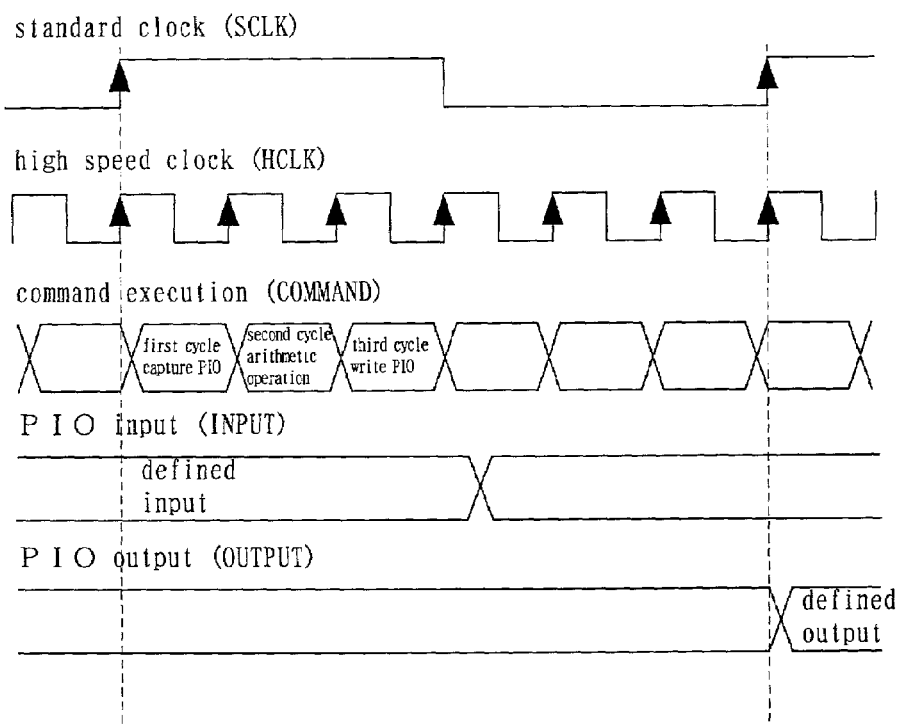
FIG. 6 is a timing chart showing another example of the first embodiment.
Figure 7:
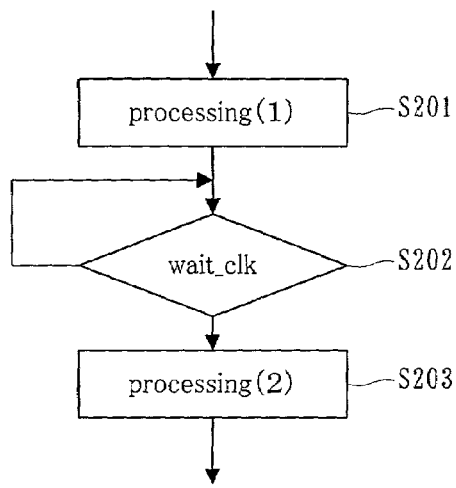
FIG. 7 is a flow chart for showing the important parts of the second embodiment of a program logic device according to the present invention.
Figure 8:
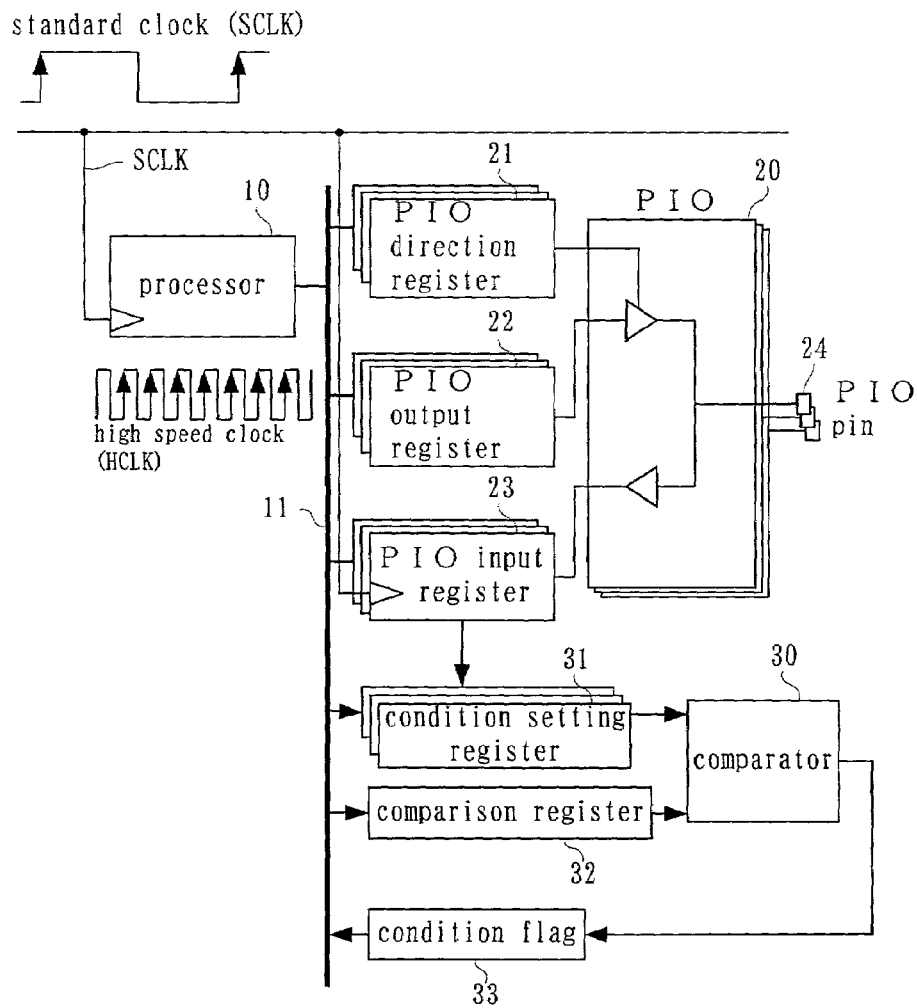
FIG. 8 is a block diagram showing the third embodiment of a program logic device according to the present invention.
Figure 9:
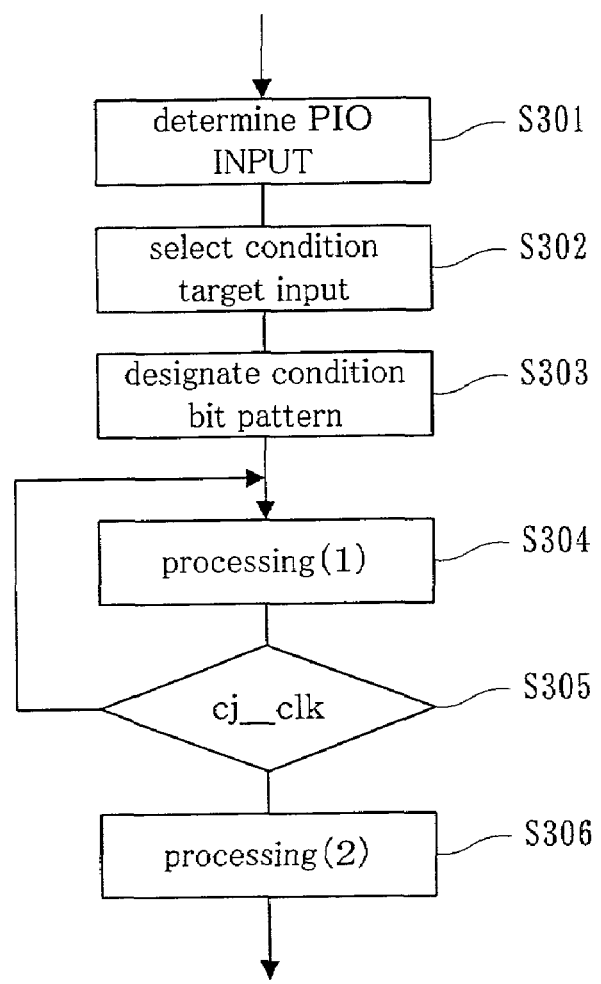
FIG. 9 is a flow chart for showing the important part of the third embodiment shown in FIG. 8.
Figure 10:
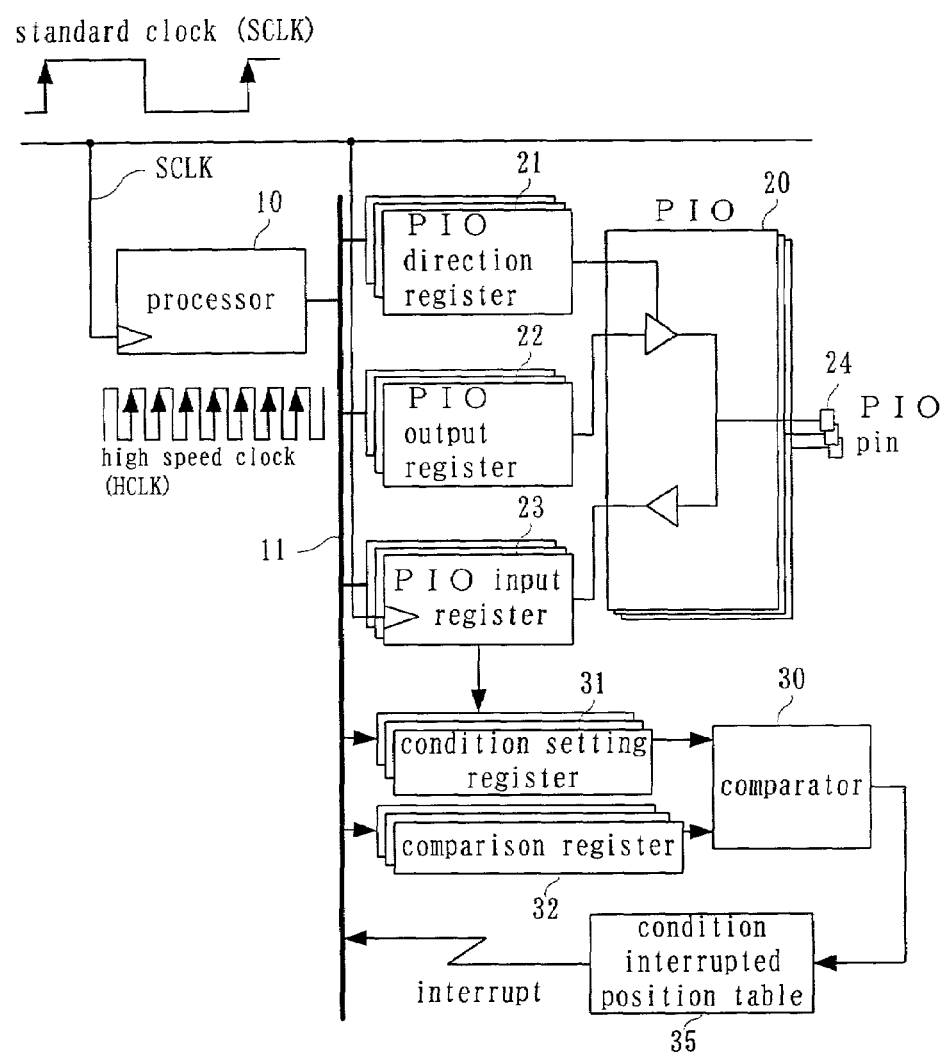
FIG. 10 is a block diagram showing the fourth embodiment of a program logic device according to the present invention.

The embodiments of the present invention will be concretely described hereinafter with reference to the drawings. FIGS. 1 to 6 show the first embodiment of the present invention. FIG. 7 shows the second embodiment. FIGS. 8 and 9 show the third embodiment. FIG. 10 shows the fourth embodiment.

(First Embodiment)

Figure 1:
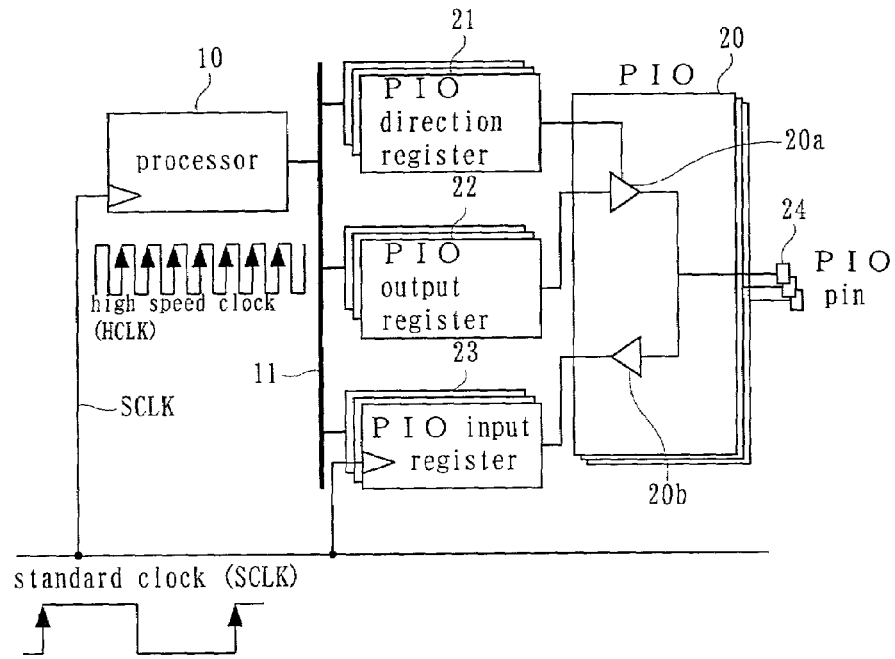
FIG. 1 is a block diagram showing the first embodiment of a program logic device according to the present invention.
Figure 2:
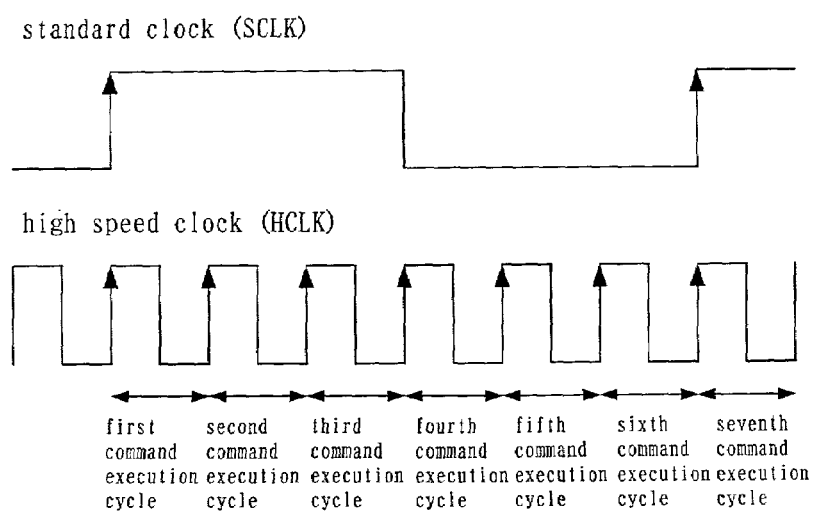
FIG. 2 is a clock chart of the first embodiment shown in FIG. 1.
Figure 3:
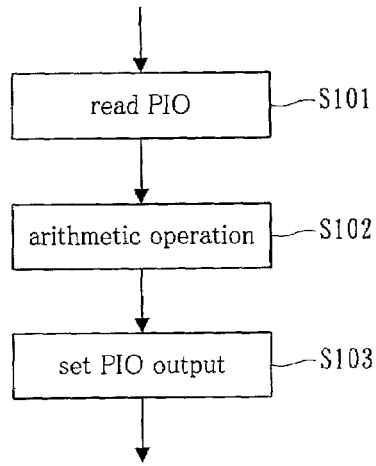
FIG. 3 is a flow chart for showing the important part of the first embodiment shown in FIG. 1.
Figure 4:
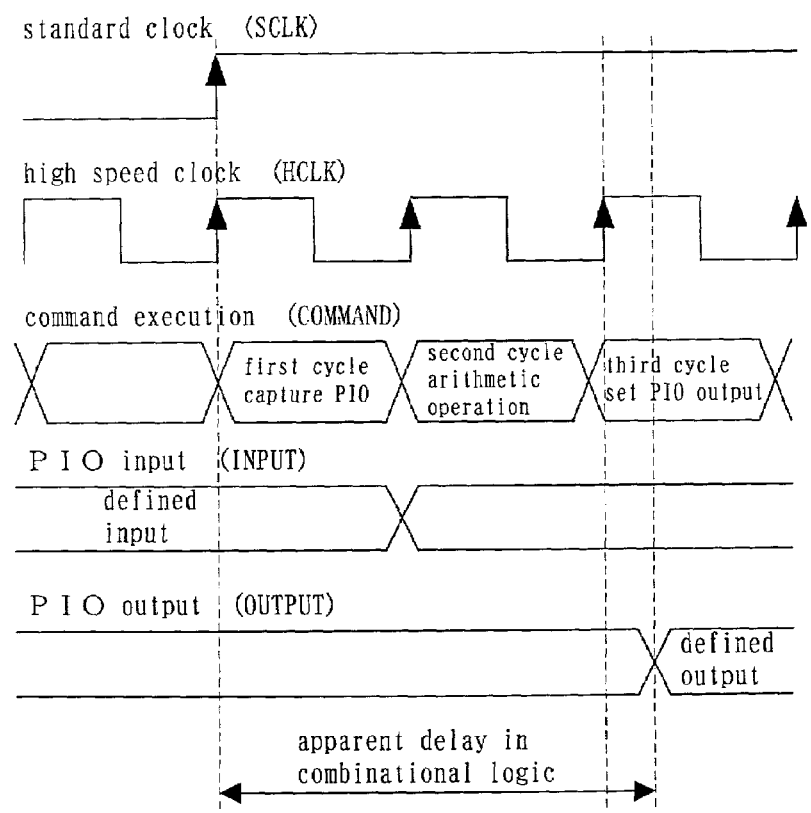
FIG. 4 is a timing chart of the first embodiment shown in FIG. 1.

FIG. 1 is a block diagram showing the first embodiment of a program logic device according to the present invention. FIG. 2 is a clock chart of the first embodiment. FIG. 3 is a flow chart showing the important parts of the first embodiment. FIG. 4 is a timing chart. FIG. 5 is a flow chart showing the important parts of another example of the first embodiment. FIG. 6 is a timing chart showing an example of another example of the first embodiment.

In FIGS. 1 to 4, a processor 10 is a microprocessor serving as a control processor controlling an electronic device of various types. The processor 10 executes a programmable sequence (or control) by means of a software. The concrete program (or the description of the concrete content of the control) executed by the processor 10 is stored in storage means provided in the processor 10 or in storage means (not shown) such as a memory connected through a bus 11. The processor 10 randomly reads the program from the storage means and executes control.

A PIO 20 is an abbreviation of a peripheral input-output, which is input and output means for inputting and outputting signals (or digital information) to and from an external logic constitution of the processor 10. Here, the logic constitution normally refers to an electronic circuit connectable externally of the PIO 20. As long as the logic constitution can electrically exchange signals with the PIO 20, the manner thereof is not limited. To be specific, the logic constitution is a logic device or a logic unit of various types, a parallel interface or a parallel bus of various types, a serial interface or a serial bus of various types, a digital display equipment of various types or the like. The logic device or logic unit of various types is exemplified by an ASIC, an external microprocessor, an FPGA, a PLD or the like. The parallel interface or the parallel bus of various types is exemplified by a PCI bus, an SCSI bus, an ATA bus, a PC card bus, an IEEE1284 or the like. The serial interface or serial bus of various types is exemplified by an I2C bus, an MUSE bus, a 3 wire-serial, a 4 wire-serial or the like. The digital display equipment of various types is exemplified by an LCD, a PDP or the like.

The PIO 20 is constituted out of a buffer 20a for ON/OFF controllable output, a buffer 20b for input and PIO pins 24 serving as input/output terminals. The processor 10 is connected to the PIO 20 through the bus 11. The processor 10 exchanges information with the PIO 20 through a PIO direction register 21, a PIO output register 22 and a PIO input register 23. The PIO input register 23 reflects the state of the buffer 20b. The PIO output register 22 reflects the state of the buffer 20a. The PIO direction register 21 is connected to the ON/OFF control terminal of the buffer 20a. It is noted that each register is constituted to be capable of temporarily storing information and utilizing the content of the stored information at appropriate time and that the register may be mapped in an address region on a memory map.

If the processor 10 reads a signal through the PIO 20, the processor 10 reads the content of the PIO input register 23 in response to a command to read information in the register to thereby read the input signal. A standard clock SCLK is connected to the PIO input register 23. The PIO input register 23 is defined synchronously with the standard clock SCLK. In this embodiment, the PIO input register 23 is defined at the first transition of the standard clock SCLK; however, the definition of the PIO input register 23 is not limited thereto. Alternatively, the standard clock SCLK maybe directly connected to the PIO output register 22. If the processor 10 outputs a signal through the PIO 20, the processor 10 first writes information for turning on the buffer 20a into the PIO direction register 21 in response to a command to write information in the register. Next, the processor 10 writes information to be outputted into the PIO register 22 in response to a command to write information in the register, to thereby allow the PIO pin 24 to output predetermined information. It is noted that since a plurality of PIO pins 24 and a plurality of buffers 20a and 20b are prepared, it is possible to input and output signals for each bit or plural bits.

In this embodiment, description is given to a case of using the PIO 20. The input/output interface used for the processor 10 to exchange information is not limited to the PIO 20. Alternatively, not terminals such as the PIO pins 24 serving as both input and output terminals but an input/output interface having input and output pins independent of one another may be used or input and output pins provided at the processor 10 may be used without using the input/output interface.

The clock for allowing the processor 10 to operate is connected to the PIO input register 23. A high speed clock HCLK generated based on the standard clock SCLK, based on which the external logic constitution operates, is used. As shown in FIG. 2, the high speed clock HCLK is six multiples of the standard clock SCLK in this embodiment. Multiplication may be conducted either inside of the processor 10 or outside thereof by means of a hardware.

Next, the operation of the program logic device in the first embodiment will be described. The program logic device refers to an entire device capable of inputting and outputting external information by means of a program. In this embodiment, the program logic device consists of the processor 10, the PIO 20, the bus 11 and the like. Alternatively, the program logic device can be regarded as a state machine. The state machine herein is employed for an entire control circuit in a device (or system) constituted by a logic circuit. The state machine is a circuit for executing a series of defined sequences (or control).

As shown in FIG. 4, the processor 10 executes a command (COMMAND) in the first cycle synchronously with the standard clock SCLK and captures the data of the PIO 20 synchronously with the standard clock SCLK. As a result, a PIO input (INPUT) is defined in the processor 10 (in a step S101 in FIG. 3). Next, the processor 10 selects and executes an arithmetic operation preset according to the value of the defined PIO input (INPUT) as an operation in the second cycle (in a step S102 in FIG. 3). Then, the processor 10 sets an PIO output (OUTPUT) based on the operation result as an operation in the third cycle and outputs the operation result from the PIO pin 24 (in a step S103 in FIG. 3). In this case, as shown in FIG. 4, the PIO output (OUTPUT) becomes a defined output with an apparent delay from the defined input (synchronous with the standard clock SCLK).

Further, as shown in FIGS. 5 and 6, it is possible to synchronize the defined PIO output (OUTPUT) with the standard clock SCLK (in S113 in FIG. 5). In this embodiment, by multiplying the standard clock SCLK by six, it is possible to define the input and output within one cycle of the standard clock SCLK. However, with the relationship of the logic device with the external logic constitution, there are some cases where it is inappropriate to define an output within one cycle of the standard clock SCLK. In these cases, after waiting for an arbitrarily set number of cycles of the standard clock SCLK, an output may be defined. The processor 10 can move to different control as long as the processor 10 completes an arithmetic operation for defining the output.

According to this embodiment, while the processor 10 is executing a plurality of processings according to the high speed clock HCLK, the PIO 20 can determine control according to the value of the signal captured synchronously with the standard clock SCLK and the output value of the PIO 20 can be changed according to the control. This makes it possible to define a logic synchronous with the standard clock SCLK. Namely, the logic device can correctly exchange information with the logic constitution connected to the processor 10 and operating synchronously with the standard clock SCLK.

In addition, since it is possible to change the output value of the PIO 20 synchronously with the standard clock SCLK, it is possible to further ensure exchanging information with the logic constitution connected to the processor 10 and operating synchronously with the standard clock SCLK.

Furthermore, since the processor 10 can describe a sequence consisting of at least one command within one cycle of the standard clock SCLK, it is possible to further ensure exchanging information with the logical constitution connected to the processor 10 using a successive implementation language such as assembler, C, C++ or JAVA or the like. Besides, with the use of such language expression, it is possible to establish a state machine.

(Second Embodiment)

FIG. 7 is a flow chart showing the important parts of the second embodiment of a program logic device according to the present invention.

A processor 10 has a delay function to synchronize with a standard clock SCLK and has a constitution capable of conducting next control after waiting for the predetermined transition of the standard clock SCLK. To be specific, with respect to the delay function, there is a method of, for example, attaining the delay function by means of a program. A delay branching command wait_clk synchronous with the standard clock SCLK, as shown in a step S202 of FIG. 7, is realized by a program. When finishing a processing (1) in a step S201, the delay branching command wait_clk repeats a loop (in a step S202) until the first transition of the standard clock SCLK in the next cycle appears. When the first transition appears, the processing moves to a processing (2) in a step S203 for conducting next control. It is noted that the transition of the standard clock SCLK for escaping from the delay loop is not limited to the first transition but may be the last transition. Alternatively, after repeating the first and last transitions a few number of times, the delay branching command wait_clk may be escaped from the loop synchronously with the transition of the standard clock SCLK.

In the loop, the processor 10 may be in an actual wait state or may conduct other control in the back of the delay function. As the control executed by the processing (2) in the step S203, control other than that carried out before entering the loop or in the loop is normally selected and executed.

According to the second embodiment of the present invention, the processor 10 has a delay function for synchronizing with the standard clock SCLK and has a constitution for conducting the next control after waiting for the transition of the standard clock SCLK, whereby it is possible to conduct control synchronous with the standard clock SCLK. Further, the content of the control of the processor 10 is determined according to the value of the signal captured by the PIO 20 synchronously with the standard clock SCLK. It is, therefore, possible to branch control synchronously with the standard clock SCLK.

(Third Embodiment)

FIG. 8 is a block diagram showing the third embodiment of a program logic device according to the present invention. FIG. 9 is a flow chart showing the important parts of the third embodiment.

In FIG. 8, a comparator 30 is comparison means for comparing a value inputted from a PIO 20 through a PIO input register 23 with a value stored by a processor 10 in a comparison register 32 serving as comparison value storage means in advance. A value inputted, as a defined value, into the PIO input register 23 is stored in a condition setting register 31 for comparison purposes. The comparator 30 reads a value captured by the PIO 20 through the condition setting register 31. The comparator 30 compares the value of the condition setting register 31 with the value of the comparison register 32 and stores a comparison result in a condition flag 33. The condition setting register 31, the comparison register 32 and the condition flag 33 can be accessed for reference, change or the like by the processor 10 through a bus 11 as in the case of a register such as a PIO direction register 21.

Next, the operation of the program logic device in the third embodiment will be described. First, as shown in FIG. 9, the processor 10 selects a PIO pin 24 which becomes a comparison target (in a step S301). The number of selected pins 24 may be either one or not less than two. Next, the processor 10 selects a PIO pin 24 which becomes a condition target (in a step S302) In this designation, the processor 10 may have not only a function of selecting a condition target but also a function of arranging a selected sequence of bits in the condition setting register 31 in order to facilitate comparing the bits as a continuous bit pattern. To arrange a sequence of bits in order, a pattern can be created through a predetermined logic computing element and a sequence of bits can be stored in the condition setting register 31. That is to say, the condition setting register 31 functions as preprocessing means. The logic computing element may be a fixed hardware logic or a PLD capable of changing the content of an operation. Information stored in the condition setting register 31, which is fed to the condition setting register 31 through the PIO input register 23, is a value synchronous with a standard clock SCLK.

Next, the processor 10 writes a value, which becomes a condition target which forms the basis for comparison, into the comparison register 32 (in a step S303). The value stored in the condition setting register 31 is not limited to a value stored therein directly from the PIO input register 23. The processor 10 may perform an arithmetic operation based on the value of the PIO input register 23 and store an operation result in the condition setting register 31. Also, a pattern processed by the condition setting register 31 can be used as the output pattern of the PIO 20 through the bus 11.

The comparator 30 performs a comparison operation with respect to the values from the condition setting register 31 and the comparison register 32 and reflects a comparison result on the condition flag 33. The processor 10 may carries out another processing (1) in a step S304 until changing control using the conditions of the condition flag 33 (in a step S305), escape the loop of CJ_CLK (in a step S305) in accordance with a desired change in the condition flag 33 and move control to a processing (2) in a step S306.

The condition flag 33 is not limited to a coincidence flag indicating the complete coincidence of a bit pattern but may be a flag indicating partial coincidence thereof or comparison in magnitude. Thus, the configuration of the condition flag 33 is not limited by a comparison method.

Further, it is possible to change control to be carried out next according to a value set at the condition flag 33. That is to say, it is possible to change control synchronously with the standard clock SCLK in response to the concrete pattern of the input value of the PIO 20 synchronous with the standard clock SCLK.

According to the third embodiment 3, the program logic device has the condition setting register 31 and the comparator 30. Due to this, even if the processor 10 performs such a complex comparison arithmetic operation as to be required to be completed within one cycle of the standard clock SCLK, the processor 10 can conduct control which is set synchronously with the standard clock SCLK, according to the limited number of cycles of a high speed clock HCLK by performing the comparison arithmetic operation using the condition setting register 31 and the comparator 30 capable of processing the operation at high speed.

If the condition flag 33 is not set at an expected value no matter how long the processor 10 waits after the processor 10 enters the CJ_CLK loop (in the step S305), the processor 10 is to be in a flag wait state indefinitely. To avoid this, several methods are contrived. The first method is to release a wait state by controlling the processor 10 for itself. To be specific, after the processor 10 turns into a wait state, the processor 10 starts a counter within the processor 10 and the wait state is released by counting up the counter.

The second method is to count the number of the cycles of the standard clocks SCLK after the processor 10 turns into a wait state and to release the wait state when the number reaches a predetermined number.

The third method is to release a wait state if the bit pattern of the PIO 20 satisfies a certain condition. Here, the certain condition is a condition that the bit pattern becomes a predetermined shape, a condition that the bit pattern falls within a predetermined range, a condition that the number of times at which the bit pattern is inputted becomes not less than a predetermined number or the like. The PIO pins 24 constituting the bit pattern may be arbitrarily selected. In any case, the PIO pins 24 contribute to the acceleration of an error processing. Further, if adopting the second or third method, the origin of the error processing can be generated by a hardware, thereby making it possible to accelerate the error processing and, at the same time, to prevent the program from becoming complex and to reduce a burden imposed to control.

(Fourth Embodiment)

FIG. 10 is a block diagram showing the fourth embodiment of a program logic device according to the present invention.

In FIG. 10, a condition interrupted position table 35 stores information on an interrupted position selected based on the comparison result of a comparator 30. If a result to generate a predetermined interrupt is fed to the condition interrupted position table 35 from the comparator 30, the condition interrupted position table 35 generates an interrupt corresponding to the result thus fed. The interrupted position may be the processor 10 or the other device (or the other processor) connected on a bus 11. As in the case of the third embodiment, the result to generate a predetermined interrupt from the comparator 30 is not limited to a coincidence flag indicating the complete coincidence of a bit pattern but may be partial coincidence thereof or a comparison based on magnitude. The result is not limited by a comparison method. Since a condition setting register 31 and a comparison register 32 are the same as those in the third embodiment, no description will be given thereto.

According to the fourth embodiment, an interrupt synchronous with a standard clock SCLK is generated in the processor 10 in accordance with the value of a signal captured by a PIO 20 synchronously with the standard clock SCLK. Due to this, it is possible to correctly exchange information with a logical constitution synchronous with the standard clock SCLK using interrupt timing synchronous with the standard clock SCLK.

Further, by changing the interrupted position of the processor 10 according to the value of the signal captured by the PIO 20 synchronously with the standard clock SCLK, it is possible to select interrupted position control by a defined, synchronous input pattern, to easily move to predetermined control without carrying out an operation for specifying the cause of the occurrence of an interrupt using a program and to thereby easily realize the acceleration of the program.

Furthermore, the program logic device has the condition setting register 31 and the comparator 30. Due to this, even if the processor 10 performs such a complex comparison arithmetic operation that cannot be completed within one cycle of the standard clock SCLK, the processor 10 can conduct control which is set synchronously with the standard clock SCLK, according to the limited number of cycles of a high speed clock HSCL and deal with an interrupt by performing the comparison arithmetic operation using the condition setting register 31 and the comparator 30 capable of processing the operation at high speed.

It is noted that the processor 10, the bus 11, the PIO 20, the comparator 30 and the like described in the first to fourth embodiments can be contained in one package so as to make a program logic device small in size.

Moreover, the number of processors 10 provided in the program logic device is not limited to one but a plurality of processors 10 may be provided in the program logic device.

According to the invention recited in claim 1, while the control processor is executing a plurality of processings according to the high speed clock, control can be determined according to the value of the signal captured by the input means synchronously with the standard clock within one cycle and a value of the output means can be changed by the control. Due to this, the logic synchronous with the standard clock can be defined. Namely, it is possible to correctly exchange information with a logical constitution connected to the control processor and operating synchronously with the standard clock.

Further, the control processor can describe a sequence consisting of at least one command within one cycle of the standard clock, a successive implementation language can be used.

According to the invention recited in claim 3, the value of the output means can be changed synchronously with the standard clock. Due to this, it is possible to ensure exchanging information with the logic constitution connected to the control processor and operating synchronously with the standard clock.

According to the invention recited in claim 4, the control processor has a delay function to synchronize with the standard clock and is constituted to conduct the next processing after waiting for a predetermined transition of the standard clock. Due to this, it is possible to conduct control synchronously with the standard clock.

According to the invention recited in claim 5, the control content of the control processor is determined according to the value of the signal captured by the input means synchronously with the standard clock. Due to this, it is possible to branch control synchronously with the standard clock.

According to the invention recited in claim 6, the program logic device comprises a comparator for comparing the comparison value with the value of the signal captured by the input means synchronously with the standard clock. Due to this, it is not necessary for the control processor to perform a complex arithmetic operation and it is possible to conduct preset control synchronously with the standard clock according to a predetermined number of cycles of the clock.

According to the invention recited in claim 7, the program logic device comprises preprocessing means for performing an arithmetic operation of the value of the signal captured by the input means synchronously with the standard clock, and for setting the value of the signal, and a comparator for comparing the comparison value with the value set by the preprocessing means. Due to this, it is not necessary for the control processor to perform a more complex arithmetic operation and it is possible to conduct preset control synchronously with the standard clock according to a predetermined number of cycles of the clock.

According to the invention recited in claim 8, after waiting for the value of the signal captured by the input means synchronously with the standard clock to become a predetermined value, the control set by the predetermined value is conducted. Due to this, it is possible to conduct the control set by the predetermined value synchronously with the standard clock.

According to the invention recited in claim 9, a wait state is released when the number of cycles of the standard clock reaches a predetermined number after the wait state. Due to this, even if the value of the signal captured by the input means synchronously with the standard clock does not reach a predetermined value indefinitely, the control processing can move to the next control and an error can be dealt with at high speed.

According to the invention recited in claim 10, a wait state is released by controlling the control processor for itself. Due to this, even if the value of the signal captured by the input means synchronously with the standard clock does not reach a predetermined value indefinitely, the control processing can move to the next control and an error can be dealt with at high speed.

According to the invention recited in claim 11, a wait state is released when the value of the signal captured by the input means becomes a predetermined value. Due to this, even if the value of the signal captured by the input means synchronously with the standard clock does not reach a predetermined value indefinitely, the control processing can move to the next control and an error can be dealt with at high speed.

According to the invention recited in claim 12, an interrupt synchronous with the standard clock is generated to the control processor according to the value of the signal captured by the input means synchronously with the standard clock. Due to this, it is possible to correctly exchange information with the logic constitution synchronous with the standard clock using interrupt timing synchronous with the standard clock.

According to the invention recited in claim 13, the program logic device comprises a comparator for comparing the comparison value with the value of the signal captured by the input means synchronously with the standard clock. Due to this, it is not necessary for the control processor to perform a complex arithmetic operation and it is possible to conduct preset control synchronously with the standard clock according to a predetermined number of cycles of the clock.

According to the invention recited in claim 14, the program logic device comprises preprocessing means for performing an arithmetic operation of the value of the signal fetched by the input means synchronously with the standard clock, and for setting the value of the signal; and a comparator for comparing the comparison value with the value of the signal set by the preprocessing means. Due to this, it is not necessary for the control processor to perform a more complex arithmetic operation and it is possible to conduct preset control synchronously with the standard clock according to a predetermined number of cycles of the clock.

According to the invention recited in claim 15, an interrupted position in the control processor is changed according to the value of the signal captured by the input means synchronously with the standard clock. By doing so, it is possible to select interrupted position control according to the synchronous, defined input patter, to easily move to predetermined control without carrying out an operation for specifying the cause of the occurrence of the interrupt by means of a program and to thereby realize the acceleration of the program.

What is claimed is:

1. A program logic device comprising:
   a control processor operating according to a high speed clock, the high speed clock obtained by multiplying a standard clock;
   input means for inputting signal information into the control processor; and
   output means for outputting signal information from the control processor as a signal, wherein
   while the control processor is executing a plurality of processings according to the high speed clock, the control processor performs an operation according to signal information that is captured from the input means synchronously with the standard clock and a value of the output means is changed by the control processor within one cycle of the standard clock.

2. A program logic device according to claim 1, wherein the program logic device comprises:
   comparison value storage means for storing a predetermined comparison value in advance;
   preprocessing means for performing an arithmetic operation of the value of the signal fetched by said input means synchronously with said standard clock, and for setting the value of the signal; and
   a comparator for comparing the comparison value with the value of the signal set by the preprocessing means, and wherein
   an interrupt synchronous with the standard clock is generated to said control processor.

3. A program logic device according to claim 1, wherein the value of said output means is changed synchronously with said standard clock.

4. A program logic device according to claim 1, wherein said control processor has a delay function to synchronize with said standard clock and conducts a next processing after waiting for a predetermined transition of the standard clock.

5. A program logic device according to claim 1, wherein the control conducted by said control processor is determined according to the value of the signal captured by said input means synchronously with said standard clock.

6. A program logic device according to claim 1, wherein the program logic device comprises:
   comparison value storage means for storing a predetermined comparison value in advance; and
   a comparator for comparing the comparison value with the value of the signal captured by said input means synchronously with said standard clock, and wherein
   a control content of said control processor is determined according to a comparison result of the comparator.

7. A program logic device according to claim 1, wherein the program logic device comprises:
   comparison value storage means for storing a predetermined comparison value in advance;
   preprocessing means for performing an arithmetic operation of the value of the signal captured by said input means synchronously with said standard clock, and for setting the value of the signal; and
   comparison means for comparing the comparison value with the value set by the preprocessing means, and wherein
   a control content of said control processor is determined according to a comparison result of the comparator.

8. A program logic device according to claim 1, wherein after waiting for a value of the signal information that is captured from said input means synchronously with said standard clock to become a predetermined value, said control processor performs an operation according to the predetermined value.

9. A program logic device according to claim 8, wherein a wait state is released when the number of cycles of said standard clock reaches a predetermined number after the wait state.

10. A program logic device according to claim 8, wherein a wait state is released by controlling said control processor for itself.

11. A program logic device according to claim 8, wherein a wait state is released when the value of the signal captured by said input means becomes a predetermined value.

12. A program logic device according to claim 1, wherein an interrupt synchronous with the standard clock is generated to said control processor according to the value of the signal captured by said input means synchronously with said standard clock.

13. A program logic device according to claim 12, wherein
   an interrupted position in said control processor is changed according to a comparison result of said comparator.

14. A program logic device according to claim 1, wherein the program logic device comprises:
   comparison value storage means for storing a predetermined comparison value in advance; and
   a comparator for comparing the comparison value with the value of the signal captured by said input means synchronously with said standard clock, and wherein
   an interrupt synchronous with the standard clock is generated to said control processor according to a comparison result of the comparator.

15. A program logic device comprising:
a control processor operating according to a high speed clock, the high speed clock obtained by multiplying a standard clock;
input means for inputting signal information into the control processor; and
output means for outputting signal information from the control processor as a signal, wherein
while the control processor is executing a plurality of processings according to the high speed clock, the control processor performs an operation according to a value of signal information that is captured from the input means synchronously with the standard clock and the control processor selectively utilizes a delay function in order to change a value of the output means synchronously with the standard clock and within a predetermined number of cycles of the standard clock, the predetermined number of cycles being configurable by the control processor.

* * * * *